N. W. McLEOD.
MOLD FOR MAKING PNEUMATIC TIRES.
APPLICATION FILED MAY 4, 1916.
1,213,225.
Patented Jan. 23, 1917.
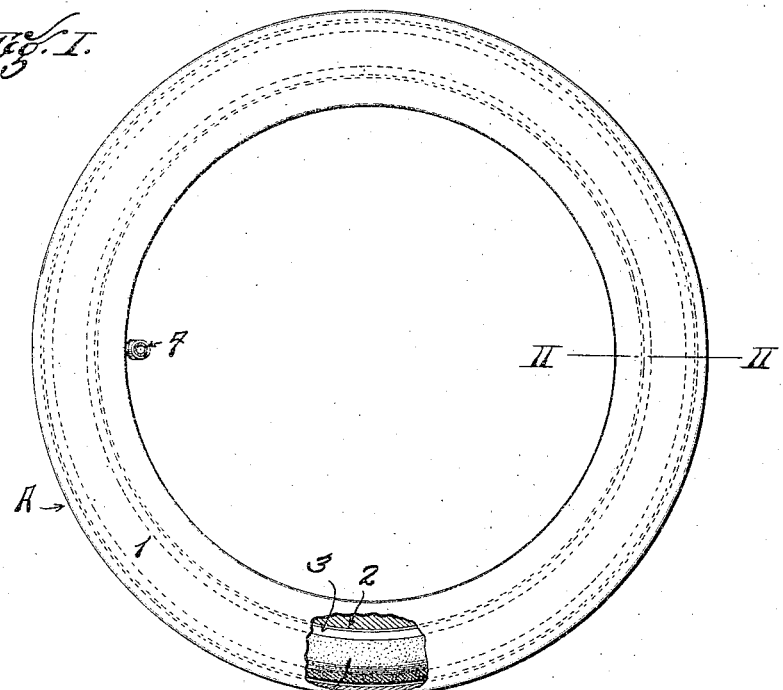
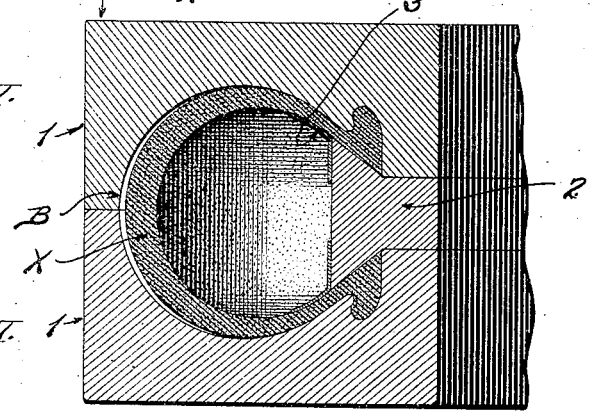
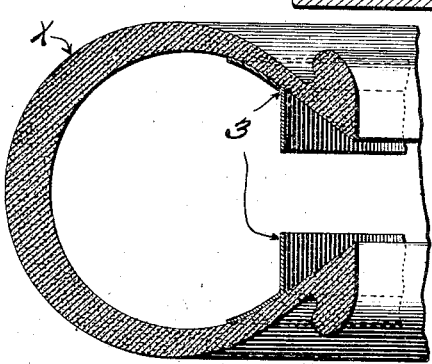
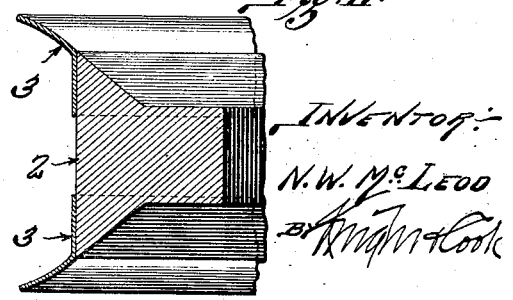
INVENTOR:
N. W. McLEOD
BY
ATTYS

UNITED STATES PATENT OFFICE.

NELSON W. McLEOD, OF ST. LOUIS, MISSOURI, ASSIGNOR TO AMERICAN MOTORS TIRE COMPANY, OF DETROIT, MICHIGAN, A CORPORATION OF MICHIGAN.

MOLD FOR MAKING PNEUMATIC TIRES.

1,213,225.   Specification of Letters Patent.   Patented Jan. 23, 1917.

Application filed May 4, 1916. Serial No. 95,338.

*To all whom it may concern:*

Be it known that I, NELSON W. McLEOD, a citizen of the United States of America, a resident of the city of St. Louis, State of Missouri, have invented certain new and useful Improvements in Molds for Making Pneumatic Tires, of which the following is a full, clear, and exact description, reference being had to the accompanying drawings, forming a part of this specification.

My invention relates to a mold for holding pneumatic tires or casings during vulcanization of the rubber therein. The mold to which my present invention relates is of the kind designed to receive internal fluid pressure which acts against the tire while it is in the mold for the purpose of forcing the tire outwardly against the wall of the mold cavity and holding it thereat during vulcanization.

Molds of the description here referred to comprise separable shell sections which, when assembled, afford an annular molding cavity for the bodies of tires and a necessary adjunct of a mold of this character is an abutment ring which is located between the separable edges of the pneumatic tire structure and between which and the shell sections said separable edges are clamped when the mold is closed.

It has been found difficult, in some instances, particularly where there are metal elements in the separable edges of the tire, to prevent leakage and permeation of the fluid introduced into the tires to expand them if reliance is placed upon merely the clamping of the separable edges of the tire between the abutment ring and the shell sections of the mold.

The object of this invention is to provide a simple and efficient means by which the pressure medium utilized to expand the tire structures in the molds is barred from access to the separable edge portions of the tires, thereby eliminating all liability of the permeation of fluid pressure medium into and through such edge portions.

Figure I is a side elevation of my mold. Fig. II is an enlarged cross section taken on line II—II, Fig. I. Fig. III is an enlarged cross section of the tire as seen in Fig. II. Fig. IV is a cross section of a modification in the form of an abutment ring having my barrier means associated therewith.

In the accompanying drawings, A designates my mold as a whole, the said mold comprising two shell sections 1—1 and an abutment ring 2 which is located between the shell sections near the inner circle of the mold. The abutment ring 2 is a member separate and independent of the shell sections 1 and it is adapted to be located at least in part in the mold cavity B where it occupies a position between the separable edges or bead edges of the pneumatic tire to be molded, in order that said edges may be clamped and held between the abutment ring and the adjacent portions of the mold shell sections.

The tire structure, composed of fabric and rubber compound in an uncured state, is introduced into the mold and its edges are confined between the mold shell sections and the abutment ring, as seen in Fig. III. The mold is then held closed in any suitable manner and fluid under pressure, preferably water, is introduced into the confined tire through the abutment ring, a suitable conducting pipe 4 being attached to the abutment ring 2 for the introduction of the fluid. The fluid under pressure delivered into the uncured tire acts to expand the tire structure and hold it firmly to the wall of the mold cavity B prior to the application of heat to the mold and the fluid pressure is continued until the rubber compound has been kept in a heated condition a sufficient length of time to vulcanize the rubber compound.

It is highly important that there be no loss of the fluid pressure medium from the interior of the tire being formed and vulcanized by permeation of the fluid through the separable edge portions of the tire which are clamped between the abutment ring and the mold sections, and to avoid such loss I use a barrier device through the medium of which the fluid delivered into the hollow tire structure in the mold is excluded from access to the edge portions of the tire.

The barrier device I prefer to use is a flexible or pliable strip 3 which is arranged within the tire X to be molded and extends from the abutment ring 2 to the inner wall of the tire inclosed by the mold. The barrier strip may be of rubberized fabric, or of any other suitable material. While I may use a single strip which will extend across the abutment ring 2 and touch the inner wall of the tire within the mold at opposite sides, I preferably use two of the barrier strips and these strips may be either attached to the wall of the tire, as seen in Fig. III, or to the abutment ring as seen in Fig. IV. It is also obvious that a barrier strip may be placed within the tire to bear against the abutment ring and tire without being secured to either of said parts.

When fluid, such as water, is introduced into a tire confined within a mold, as herein described, it acts immediately to press the flexible or pliable barrier strip or strips against the parts to which the strip or strips are not secured, and as a consequence, the said strip or strips are caused to effectually prevent passage of the fluid to the edge portions of the confined tire or to the joints between the tire and the abutment ring, thereby avoiding loss of fluid pressure within the tire.

I claim:—

1. In a mold for molding rubber articles having separable edges, a shell within which the object to be molded may be confined, an abutment device between which and said shell the separable edges of the object to be molded may be held, means for introducing fluid into the confined object, and a barrier within said object whereby the fluid introduced into said object is precluded from contact with the edge portions of the confined object.

2. In a mold for molding rubber articles having separable edges, a shell within which the object to be molded may be confined, an abutment device between which and said shell the separable edges of the object to be molded may be held, means for introducing fluid into the confined object, and a barrier independent of said annular device whereby the fluid introduced into said object is dammed from contact with the edge portions of the confined object.

3. In a mold for molding rubber articles having separable edges, a shell within which the object to be molded may be confined, an abutment device between which and said shell the separable edges of the object to be molded may be held, means for introducing fluid into the confined object, and a flexible barrier within said object whereby the fluid introduced into said object is restrained from contact with the edge portions of the confined object.

4. In a mold for molding rubber articles having separable edges, a shell within which the object to be molded may be confined, an abutment device between which and said shell the separable edges of the object to be molded may be held, means for introducing fluid into the confined object, and a barrier extending across the joint between said abutment device and the wall of said confined object whereby the fluid introduced into said object is restrained from contact with the edge portions of the confined object.

5. In a mold for molding rubber articles having separable edges, a shell within which the object to be molded may be confined, an abutment device between which and said shell the separable edges of the object to be molded may be held, means for introducing fluid into the confined object, and a flexible barrier extending across the joint between said abutment device and the wall of the confined object whereby the fluid introduced into said object is restrained from access to said joint.

6. In a mold for molding rubber articles having separable edges, a shell within which the object to be molded may be confined, an abutment device between which and said shell the separable edges of the object to be molded may be held, means for introducing fluid into the confined object, and a barrier carried by said object adapted to span the joint between said object and said abutment device to restrain the fluid introduced into said object from access to said joint.

7. In a mold for molding rubber articles having separable edges, a shell within which the object to be molded may be confined, an abutment device between which and said shell the separable edges of the object to be molded may be held, means for introducing fluid into the confined object, and a flexible barrier carried by said object adapted to span the joint between said abutment device and said confined object to restrain the fluid introduced into said confined object from access to said joint.

NELSON W. McLEOD.